Figures 1, 2:
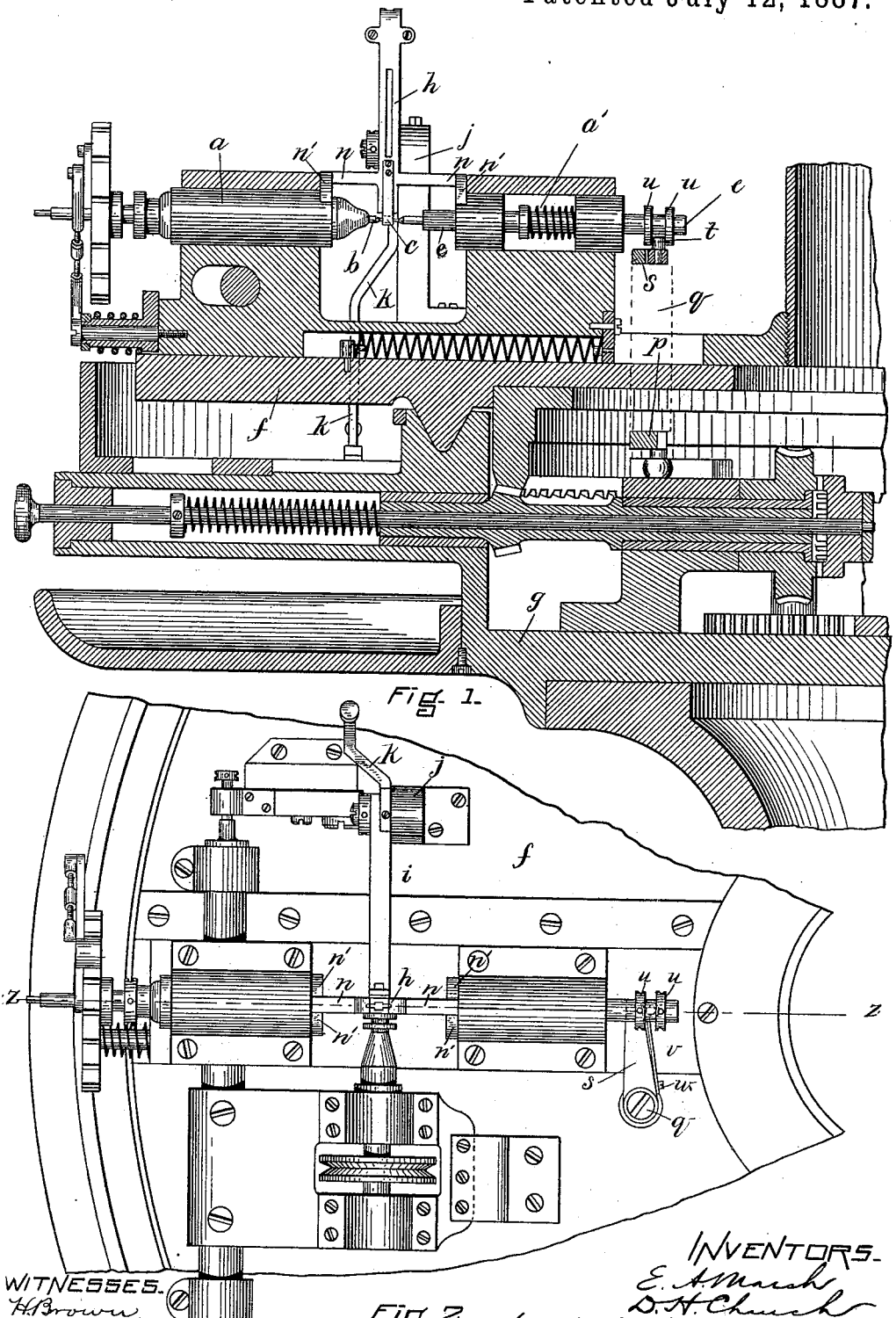

(No Model.)   5 Sheets—Sheet 1.

E. A. MARSH & D. H. CHURCH.
AUTOMATIC BLANK FEEDING DEVICE.

No. 366,592.   Patented July 12, 1887.

WITNESSES.
H. Brown.
Rich'd H. Jones.

INVENTORS.
E. A. Marsh,
D. H. Church,
by Wright, Brown & Quimby
Attys.

(No Model.) 5 Sheets—Sheet 3.

E. A. MARSH & D. H. CHURCH.
AUTOMATIC BLANK FEEDING DEVICE.

No. 366,592. Patented July 12, 1887.

WITNESSES. INVENTORS.

(No Model.) 5 Sheets—Sheet 4.
E. A. MARSH & D. H. CHURCH.
AUTOMATIC BLANK FEEDING DEVICE.
No. 366,592. Patented July 12, 1887.
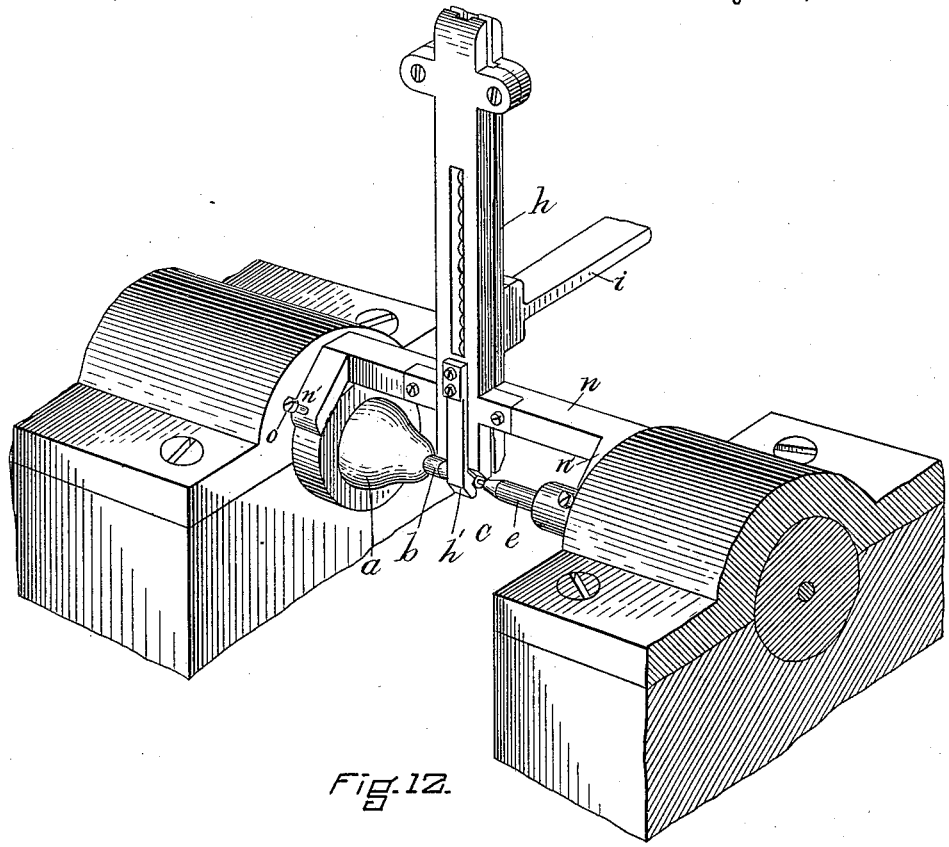
Fig. 12.
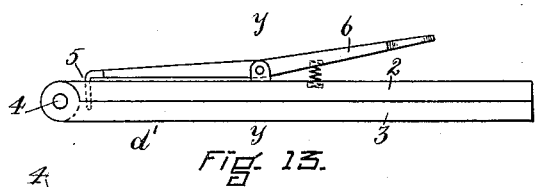
Fig. 13.
Fig. 14.
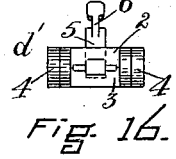
Fig. 16.
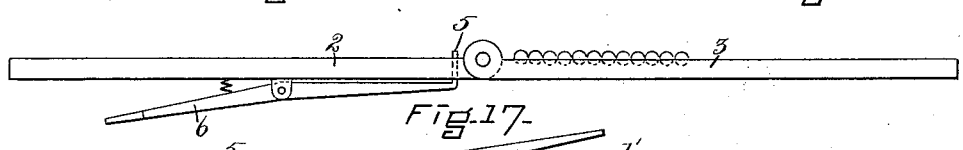
Fig. 17.
Fig. 18.
WITNESSES.
H. Brown.
Rich'd H Jones
INVENTORS.
E. A. Marsh
D. H. Church
by Knight Brown & Crosley
Attys.
N. PETERS, Photo-Lithographer, Washington, D. C.

(No Model.) 5 Sheets—Sheet 5.
E. A. MARSH & D. H. CHURCH.
AUTOMATIC BLANK FEEDING DEVICE.
No. 366,592. Patented July 12, 1887.
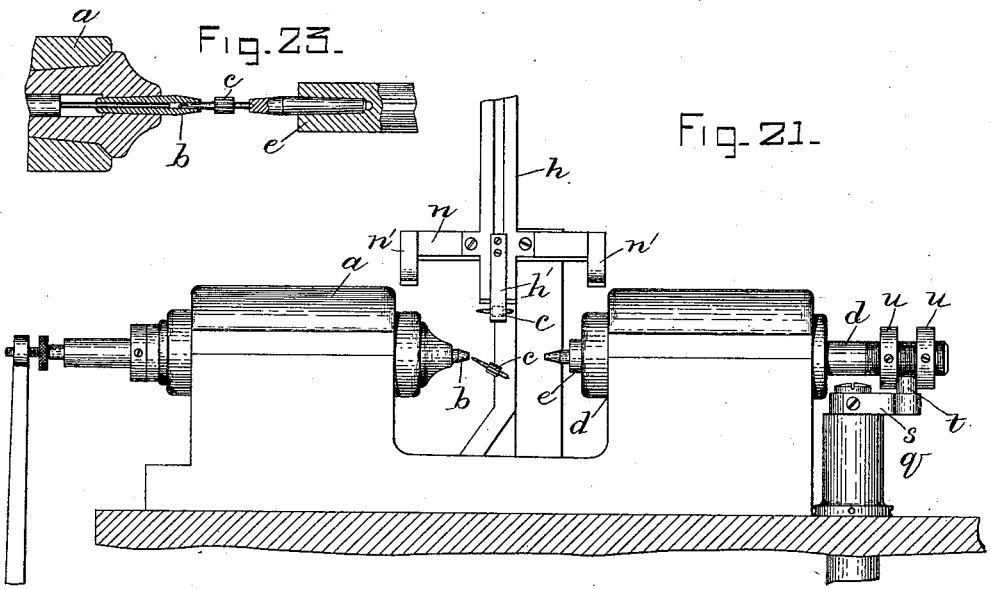
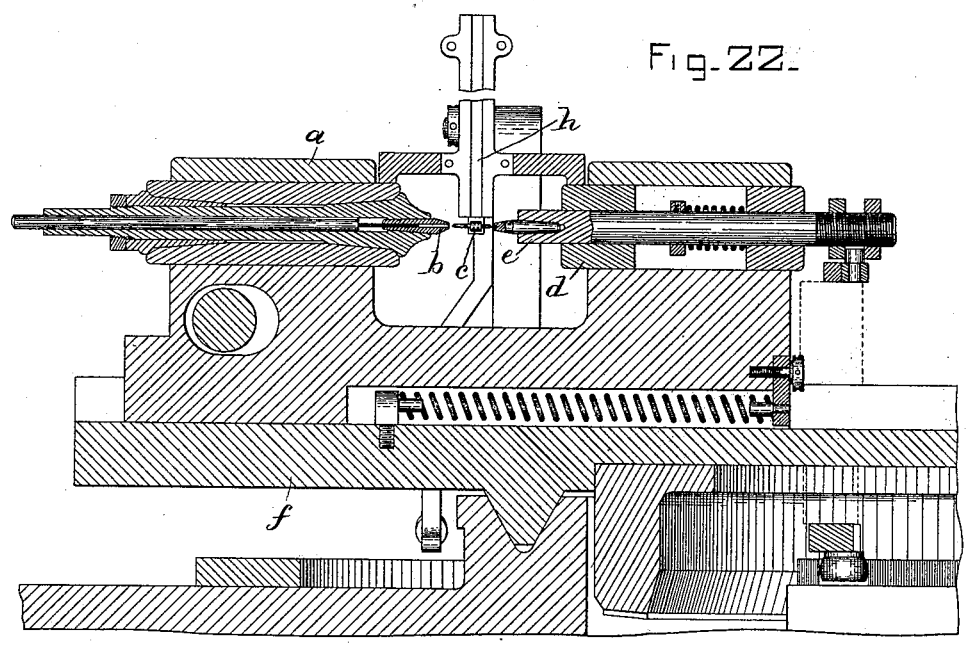
WITNESSES.
A. D. Harrison,
W. E. Ramsay.
INVENTORS.
E. A. Marsh
D. H. Church
by Wright, Brown & Crosby
Attys.

UNITED STATES PATENT OFFICE.

EDWARD A. MARSH AND DUANE H. CHURCH, OF NEWTON, MASSACHUSETTS.

AUTOMATIC BLANK-FEEDING DEVICE.

SPECIFICATION forming part of Letters Patent No. 366,592, dated July 12, 1887.

Application filed January 8, 1887. Serial No. 223,749. (No model.)

*To all whom it may concern:*

Be it known that we, EDWARD A. MARSH and DUANE H. CHURCH, of Newton, in the county of Middlesex and State of Massachusetts, have invented certain new and useful Improvements in Automatic Blank-Feeding Devices, of which the following is a specification.

In the manufacture of pinions and similar parts of watches and clocks large numbers of pieces identical in form and size are successively acted upon by the needful tools, which are kept in positive adjustment, so that the work accomplished shall be uniform in measurement and form. To bring the several pieces into a position to be acted upon by the machines or tools, it is ordinarily needful to stop the machine on the completion of the given operation, that the completed piece may be removed and another substituted by the operator, who, after the insertion of a new blank, sets the machine in motion again. If the time required for the performance of a given operation be short, (like the turning of a portion of a pinion-staff,) an operator can attend but a single machine, which may be automatic in its operation, but, as before stated, must remain idle during the time required for supplying the fresh blank.

In machines for cutting the teeth of pinions the time required for the cutting is sufficient to allow an operator to attend to two machines, which will alternately be idle while being supplied with blanks.

The object of our invention is to provide a means for automatically supplying blanks to machines for cutting the teeth of pinions, and other machines having similar general characteristics and requirements; and it consists in the improvements which we will now proceed to describe and claim.

Figure 3:
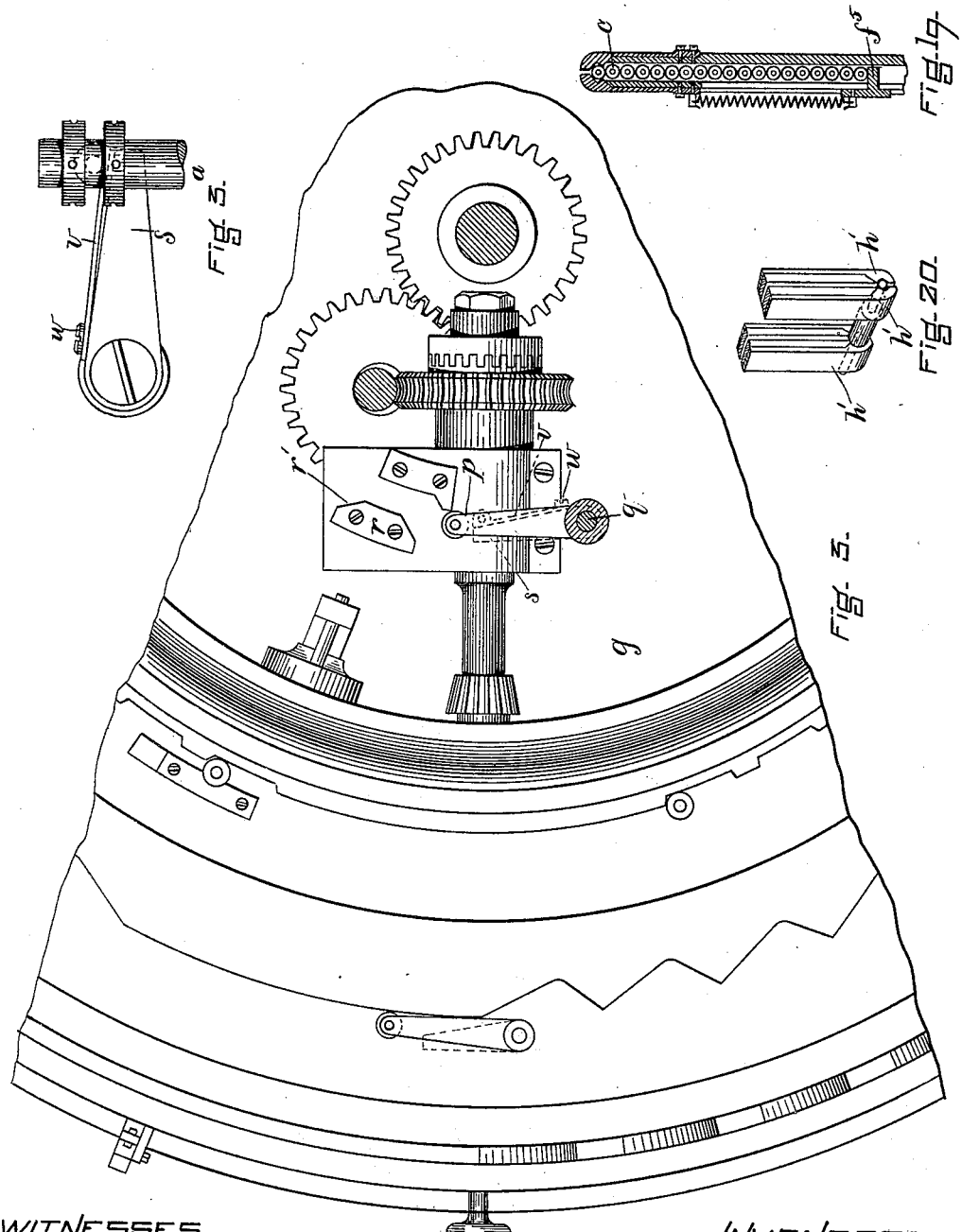
Figures 4, 5:
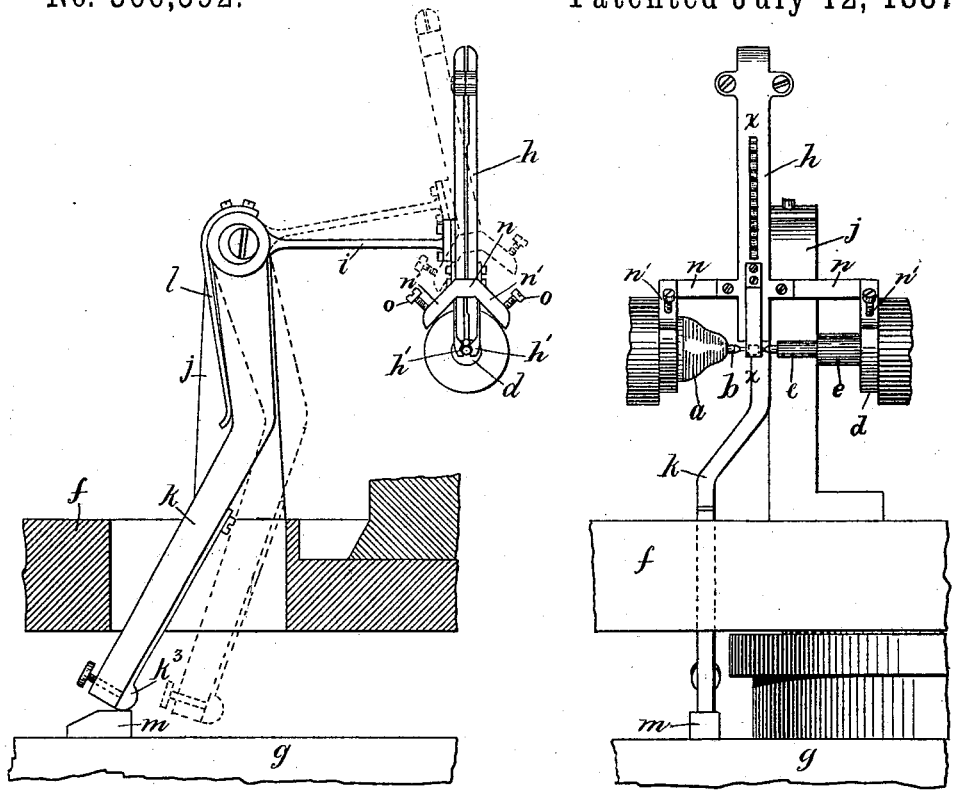
Figures 7, 8, 9:
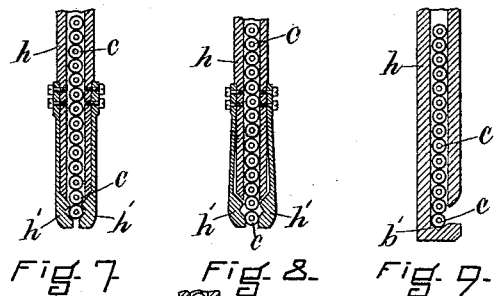
Figure 6:
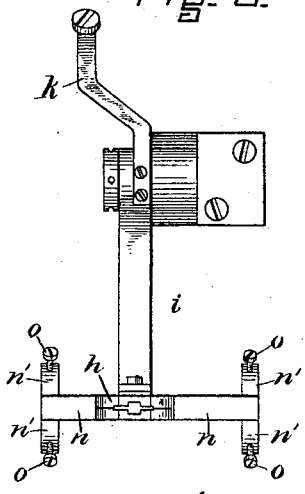
Figures 10, 11:
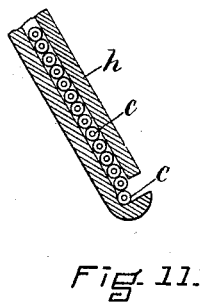

Of the accompanying drawings, forming a part of this specification, Figure 1 represents a vertical section, on line z z of Fig. 2, of a portion of the pinion-cutting machine having an automatic blank-feeding device embodying our invention. Fig. 2 represents a plan view of said portion. Fig. 3 represents a plan view of a portion of the base or fixed part of the machine. Fig. 3ª represents a detail of Fig. 3. Fig. 4 represents an end view of the blank-feeding device and a part of a tail-stock with which it co-operates. Fig. 5 represents a side view of the blank-feeding device, a part of a tail-stock, and a part of a head-stock. Fig. 6 represents a top view of the blank-feeding device. Figs. 7 and 8 represent sections on line x x, Fig. 5. Figs. 9, 10, and 11 represent sectional views of modifications. Fig. 12 represents a perspective view of the blank-feeding device and portions of the head and tail stocks. Fig. 13 represents a side view of a loading device to supply the feeding device with blanks. Fig. 14 represents a section on line y y, Fig. 13. Fig. 15 represents a plan view of one of the parts of the loading device. Fig. 16 represents an end view of the loading device. Fig. 17 represents a side view of the loading device with its hinged parts opened. Fig. 18 represents a side view of a modified form of loading device. Figs. 19 and 20 represent modifications of the rack. Fig. 21 represents a side elevation of the head and tail stock spindles, showing them just after a pinion has been released and ejected. Fig. 22 represents a longitudinal section of said parts just before the pinion-blank is inserted in the head-stock spindle by the tail-stock spindle. Fig. 23 represents a longitudinal section of parts of said spindles, showing the tail-stock spindle projected to insert a blank in the head-stock spindle.

The same letters of reference indicate the same parts in all the figures.

To illustrate our invention we have shown a head-stock, a, having a spindle, b, which has a socket adapted to receive and hold by friction one end of a staff of a pinion-blank, c, of the form used for watch-pinions, said socket being shown in section in Figs. 22 and 23, and a tail-stock, d, having a spindle, e, in line with the head-stock spindle and movable longitudinally to force the blank into the socket of the head-stock spindle, as shown in Fig. 23, and to be moved away from the blank and permit it to be ejected from the head-stock spindle, as shown in Fig. 21. Said head-stock spindle is the blank-holding device, and the tail-stock spindle is the device for forcing the blanks into the head-stock spindle, shown in the organized machine for cutting pinion-teeth forming the subject of an application for Letters Patent by Edward A. Marsh, one of the present applicants, filed December 6, 1886, Serial No. 220,784. Said machine employs a series of blank-holding devices mounted on a circular carriage or turret, *f*, which is continuously rotated, and is provided with mechanism for rotating the head-stock spindles step by step and locking them after each partial rotation, and a series of groups or sets of cutters, which are successively presented to the pinion-blanks and form teeth thereon. The mechanism for rotating and locking the spindles and for presenting the cutters to the pinion-blanks is partly supported by said turret or carriage and partly by a fixed bed, *g*, below the carriage; and as said machine is fully described in the above-named application, a detailed description thereof is not deemed necessary here, particularly as the present invention is not confined to the pinion-cutting machine shown and claimed in said application, but is shown in connection therewith for convenience of illustration and description.

In carrying out our invention we provide a feedway, *h*, formed to hold a column or series of blanks and to present said blanks successively to the point where they are acted on by the device (in this case the tail-stock spindle *e*) which inserts them in the head-stock spindle. Said feedway is oscillated or reciprocated so as to first move the foremost blank of the column into position to be engaged by the blank-holding devices (*i. e.*, the head and tail stock spindles) and then withdraw, leaving the blank held by said devices, the feedway being constructed so that in thus withdrawing it will release and move away from the held blank, whereupon the column of blanks will move forward in the rack, thus bringing another blank into the place of the one removed. The feedway is also constructed to retain the foremost blank in the series until said blank is engaged by the holding devices. In other words, the blanks cannot drop loosely out of the feedway, but are retained therein until grasped by the holding devices, the separation of the held blank from the feedway being effected by the movement of the feedway away from the blank-holding devices of the machine.

In the present instance the feedway is attached to an arm, *i*, which is pivotally connected to a standard, *j*, on the rotary turret or carriage *f*, and is attached to a lever, *k*, which projects downwardly through a slot in said carriage, and is normally held with the arm *i* and feedway *h* in the position shown in dotted lines in Fig. 4 by a spring, *l*, Fig. 4, affixed to the standard *j* and bearing at its free end on said lever. The fixed bed *g* has a projection, *m*, Figs. 4 and 5, which is in the path of the lever *k*, and when encountered by said lever forces the latter, with the arm *i* and feedway *h*, to the position shown in full lines in Fig. 4, thus bringing the lower or foremost blank in the feedway in axial line with the head and tail stock spindles. While the feedway is in this position, the tail-stock spindle is advanced by devices hereinafter described, and pushes one end of the staff of the lowest or foremost pinion-blank into the socket of the head-stock spindle. By the time this is done the lever *k* has passed away from the projection *m*, so that the spring *l* forces the feedway to its normal position, (shown in dotted lines,) thereby causing the grooved spring-jaws *h' h'* at the lower end of the feedway, which normally hold the lowest blank of the column, as shown in Fig. 7, to yield, as shown in Fig. 8, and slip off from the spindle-held blank, whereupon the next blank of the series drops between the grooved portions of said jaws and is arrested by the automatic closing of the jaws.

The feedway is provided with arms *n n*, having lugs *n' n'* formed to bear on the ends of the head and tail stocks, to insure the exact alignment of the lower blank with the spindles when the feedway is depressed. Said lugs preferably have bearing-screws *o*, whereby the depressed position of the feedway may be exactly adjusted to the spindles. This form of construction is adopted for convenience, but is not indispensable, as the alignment can be secured by other means—as by the adjustable toe $k^3$ on lever *k*.

The head-stock spindle is moved longitudinally first away from the head-stock spindle to release the completed pinion, and then toward the head-stock spindle to press a staff of the lowest or foremost blank in the feedway into the socket of the head-stock spindle by the devices next described.

After the completion of the teeth on the pinion an arm, *p*, on a rock-shaft, *q*, journaled in the rotary turret or carriage *f*, strikes an incline, *r'*, on a block, *r*, affixed to the bed *g*, and is swung thereby so as to turn the rock-shaft and cause an arm, *s*, on the upper end of said rock-shaft to draw the tail-stock spindle *e* away from the head-stock spindle, the arm *s* having a stud, *t*, which engages with collars *u u* on the spindle *e*. Said stud is attached to the free end of a spring, *v*, Figs. 2, 3, and $3^a$, which is attached at *w* to the arm *s* and bears against one side of said arm. The stud *t* therefore yields in one direction and moves positively in the other, the positive motion withdrawing the tail-stock spindle, while the yielding movement pushes the spindle to force the pinion-blank staff into the head-stock spindle. The tail-stock spindle is normally held in the position it occupies when it has forced the blank-staff into the head-stock spindle by a spring, *a'*. (Shown in Fig. 1.) This tail-stock-operating mechanism is also shown in the above-named application, and is here referred to as a good and practical way of effecting the engagement of the lower or foremost blank in the feedway with the head-stock spindle or other like device; but we do not confine ourselves to this particular mechanism.

In Fig. 9 we show a modification of the feedway, in which the spring-jaws are omitted, and one side of the feedway is extended downwardly and across the channel or blank-containing space of the feedway, and is provided with a groove, $b'$, formed to partially receive and prevent the free lateral movement of the lowest blank. This form of feedway is withdrawn from its blank-delivering position by a lateral movement instead of by a longitudinal movement. To permit this movement, the front side of the feedway is shortened to leave a space wider than the diameter of a blank between it and the extended side of the feedway. When the feedway is withdrawn, leaving the spindle-held blank, the next blank will drop into the groove $b'$ and be ready for delivery.

Fig. 10 shows another modification, in which the blank-retaining groove $b'$ is formed in a separate piece, $c'$, which is capable of yielding and thereby allowing greater latitude in the direction of the backward or withdrawing motion of the feedway.

Fig. 11 shows a feedway set at an angle and so constructed that the lowest blank will be held in position for delivery by the pressure of the succeeding blanks upon it, the upward inclination of the lip on which the lowest blank rests preventing the free movement of said blank. In this case the feedway may swing backwardly and downwardly in the arc of a circle in withdrawing from the spindle-held blank.

To facilitate the filling of the feedway with blanks, we provide an auxiliary rack or loader, $d'$, corresponding somewhat to a printer's composing-stick. This loader, as shown in Figs. 13 to 17, inclusive, is composed of two sections, 2 3, connected at one end by hinges 4 4, so that they can be separated, as shown in Fig. 17, and grooved in their inner sides to form a chamber or channel corresponding in form to that of the feedway. The loader, being opened, as shown in Fig. 17, is supplied with blanks, which are laid upon one of its sections. When the sections are closed, the blanks are normally retained by a spring-closed gate, 5, having an operating-lever, 6. Upon the withdrawal of said gate the blanks may be discharged into the feedway, the delivering end of the loader being placed upon the receiving end of the feedway, so that the channels in the two coincide. The delivering end of the loader is formed to fit upon the receiving end of the feedway, so that the act of placing the loader on the feedway will insure the coincidence of the respective channels.

In Fig. 18 we show a loader made as one piece, instead of being composed of hinged sections. In this case the blanks are introduced through an orifice, 7, in one side of the loader; or said orifice may be in the end of the loader.

Although we have described our invention as applied to a machine for cutting pinion-teeth, it will be readily seen that it may be applied to various other machines in which blanks are supplied successively to devices which hold them for the action of forming-tools, such as machines for turning staffs on pinion-blanks and machines for turning or "roughing out" pinion-blanks, &c.

We do not restrict ourselves to gravitation as the force to move the series or column of blanks, as the feedway may be provided with a spring-follower, $f^5$, as shown in Fig. 19, and set at any desired angle.

In some cases it may be necessary to provide the feedway with two pairs of jaws, $h'$, as shown in Fig. 20, arranged to grasp the staffs of the blank instead of the main portion.

We claim—

1. The combination of a feedway, constructed substantially as described, mechanism for oscillating or reciprocating said feedway, a live-spindle adapted to receive and rotate a blank, a tail-stock spindle adapted to push a blank toward and into the live-spindle, and mechanism to reciprocate said tail-stock spindle, whereby the lowest or foremost blank in the feedway is engaged with said live-spindle, as set forth.

2. A feedway adapted to contain and permit the gravitating or progressive movement of a series of blanks and provided with grooved jaws $h'$ $h'$, formed to grasp and hold accurately in a predetermined position the lower or foremost blank, combined with means for oscillating or reciprocating said feedway, and thereby presenting the said holding-jaws to and withdrawing them from the point at which the blanks are delivered, as set forth.

3. A detached loader formed to contain a series of blanks for delivery to a feedway in an organized machine, as set forth.

4. The combination, with a blank-holding feedway, constructed substantially as described, of a loader formed to fit the receiving end of the feedway and discharge blanks into the latter, as set forth.

5. A loader composed of hinged sections having their inner faces grooved to form a blank-holding channel or space, as set forth.

In testimony whereof we have signed our names to this specification, in the presence of two subscribing witnesses, this 23d day of December, 1886.

EDWARD A. MARSH.
DUANE H. CHURCH.

Witnesses:
D. W. ELDREDGE,
HENRY N. FISHER.